United States Patent [19]
Muraoka et al.

[11] 4,293,941
[45] Oct. 6, 1981

[54] MEMORY ACCESS CONTROL SYSTEM IN VECTOR PROCESSING SYSTEM

[75] Inventors: Takatoshi Muraoka, Kyoto; Keiichiro Uchida, Kawasaki; Minoru Koshino, Yokohama; Masanori Motegi, Kawasaki; Shigeru Nagasawa, Yokohama, all of Japan

[73] Assignee: Fujitsu Limited, Kawasaki, Japan

[21] Appl. No.: 40,994

[22] Filed: May 21, 1979

Related U.S. Application Data

[63] Continuation of Ser. No. 624,915, Oct. 22, 1975, abandoned.

[30] Foreign Application Priority Data

Oct. 25, 1974 [JP] Japan .............................. 49-122438

[51] Int. Cl.³ .............................................. G06F 13/00
[52] U.S. Cl. .................................................... 364/200
[58] Field of Search ... 364/200 MS File, 900 MS File

[56] References Cited
U.S. PATENT DOCUMENTS

| | | | |
|---|---|---|---|
| 3,405,396 | 10/1968 | Mendelson et al. | 364/200 |
| 3,439,347 | 4/1969 | Goshorn et al. | 364/200 |
| 3,470,540 | 9/1969 | Levy | 364/200 |
| 3,602,896 | 8/1971 | Zeheb | 364/200 |
| 3,626,374 | 12/1971 | Chinlund | 364/200 |
| 3,728,686 | 4/1973 | Weisbecker | 364/200 |
| 3,881,173 | 4/1975 | Larsen et al. | 364/200 |
| 3,938,096 | 2/1976 | Brown et al. | 364/200 |

*Primary Examiner*—Raulfe B. Zache
*Attorney, Agent, or Firm*—Daniel Jay Tick

[57] ABSTRACT

A memory access control system in a vector processing system comprises a memory unit, a memory device, address holding registers, a shift register and data buffer registers. The memory access control system distinguishes each vector data read out from the memory unit based upon the address holding registers by the output of the shift register. The shift register stores vector element numbers indicated by the memory device and transfers same to the data buffer registers. Each number from 0 to $n-1$, of a vector A composed of n elements $a_0, a_1, a_2, \ldots a_{n-1}$, is a vector element number and each data, from $a_0$ to $a_{n-1}$, is vector element data.

2 Claims, 6 Drawing Figures

MEMORY ACCESS CONTROL SYSTEM IN VECTOR PROCESSING SYSTEM

This is a continuation of application Ser. No. 624,915, filed Oct. 22, 1975, and now abandoned.

BACKGROUND OF THE INVENTION

The present invention relates to an access sequence controller for a memory unit. More particularly, the invention relates to an access sequence controller for a memory unit of a data processing system controlling the correspondence between the sequence of a vector element, which is the equivalent of the descriptor of the vector component, which indicates the element number in terms of a vector and the access sequence for the memory unit. This is accomplished by providing a queue register for controlling the access to the memory unit for the purpose of reading out each element data, which is the value of each component, of a vector. The element data elements of the vector compose the vector from the memory unit or constitute the vector stored in the memory unit.

In the field of scientific calculation, array data such as, for example, vector or matrix data, and string data are frequently used. Therefore, various ideas have been employed from both aspects of hardware and software in order to realize the arithmetic operation of such data at a high speed. However, particularly in the subjects of weather calculation, linear planning, and structure calculation, large scale array data processing becomes an important problem. For such calculation, several hundreds hours are required even when an ultra-high speed computer system is utilized.

It is assumed that an arithmetic operation of vectors B and C is included in the array date processing. When each vector is considered, respectively, as $B=(b_0,b_1,..,b_n)$ and $C=(C_0,C_1,...,C_n)$, each of $b_0,b_1,...,b_n$ and $C_0,C_1,...,C_n$ is an element data. The element data $b_0$ and $C_0$ are considered the 0th element sequence, the element data $b_1$ and $C_1$ are considered the first element sequence, and the element data $b_n$ and $c_n$ are considered the nth element sequence.

In addition, the domain in the memory unit where each element is stored is called the element address. Therefore, in actual operation, first $b_0,b_1,...,b_n$ and $C_0,C_1,...,C_n$ are read out from the memory unit using the element address. Thus, operations of $b_0$ and $C_0$, $b_1$ and $C_1$, ..., $b_n$ and $C_n$ are performed respectively. However, it is not efficient to make access individually to $b_0,b_1,b_2,...,b_n$ concerning vector B and $C_0,C_1,C_2, ..., C_n$ concerning vector C for readout of the element data from the memory unit, and to individually perform the operation of $b_0$ and $C_0$, $b_1$ and $C_1$, ..., $b_n$ and $C_n$ according to the readout sequence, because of the following reasons.

When the memory unit is divided into several domains, areas or devices so that access can be made independently from several units, the domain storing $b_0$ cannot be accessed immediately, because that domain is accessed by the other units. However, the domain storing $b_1$ can be accessed immediately in some cases. In such a case, if the access sequence is fixed, $b_0$ is read out after the access from the other units, then access is made to the memory unit for reading out $b_1$, thus resulting in queuing time. For this reason, it is not desirable, from the viewpoint of the efficiency in access to the memory unit, to fix the readout sequence.

In order to eliminate such queuing time it is only necessary to try an access to the memory unit for element data sequentially, if possible, irrespective of the sequence of $b_0,b_1...,b_n$, as long as there is a vacant domain in the memory unit.

Readout operation is performed for the vector C in a similar manner and calculation is necessary for complete vectors. In this case, however, it is necessary to manage a specific access which corresponds to an element in a specified number.

An object of the invention is to provide an access sequence controller for a memory unit, which controller is especially suitable for array data processing.

Another object of the invention is to provide an access sequence controller for a memory unit, which controller provides access to a memory unit for element data sequentially irrespective of the sequence of element data.

Still another object of the invention is to provide an access sequence controller for a memory unit, which controller functions efficiently, effectively and reliably to provide sequential access to element data in a memory unit.

BRIEF SUMMARY OF THE INVENTION

The access sequence controller of the invention comprises a plurality of address holding registers which hold the address wherein a plurality of elements of element data $b_0$, $b_1$, $b_2$, ..., $b_n$ are stored and memory means which stores "0" for $b_0$, "1" for $b_1$, ..., "n" for $b_n$, corresponding to each register. The access sequence controller of the invention provides access to the memory means with an address of the address holding registers such as, for example, an address for readout of the element data $b_1$. At such instant, the content "1" of the memory means corresponding to the address holding registers is fed in to register means. Thus, when the element data is read out from the memory means, the element data of the first element sequence is recognized by referring to the content "1" of said register means.

In accordance with the invention, an access sequence control system for a memory unit in a data processing system for reading out element data from the memory unit and providing sequential data processing, especially for vector processing, comprises an address holding register means for holding addresses which indicate where the element data is stored. Memory means stores the sequence data indicating the sequence of an element data stored in the memory unit. Shift register means is connected to the memory means at least for storing the contents of the memory means corresponding to the address which is in use for accessing to the memory unit in accordance with a selected content of the address holding register means. Data buffer register means is connected to the memory unit and controlled by the output of the shift register means whereby the element data read out from the memory unit is stored at a location of the data buffer register means by means of the output indication of the shift register means.

The memory device comprises a plurality of registers corresponding to the address holding register. A counter is connected to a plurality of registers for supplying the sequence data to the registers. The sequence data corresponds to the address set in the address holding register.

BRIEF DESCRIPTION OF THE DRAWINGS

In order that the invention may be readily carried into effect, it will now be described with reference to the accompanying drawings, wherein.

In the figures the same components are identified by the same reference numerals.

DETAILED DESCRIPTION OF THE INVENTION

Figure 1:
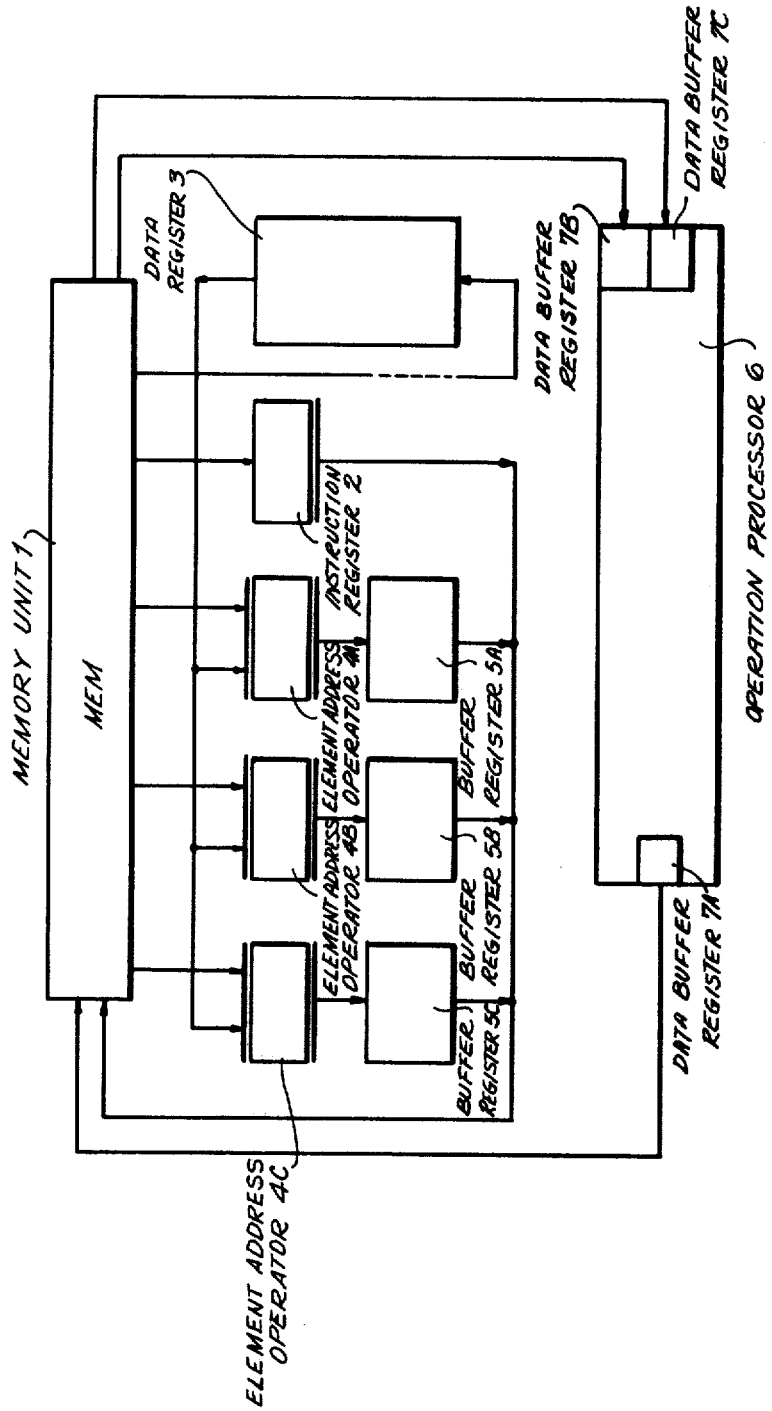
FIG. 1 is a block diagram of an embodiment of the access sequence controller of the invention for a memory unit, which access sequence controller is adapted for vector operation.

FIG. 1 is a block diagram of an embodiment of the access sequence controller of the invention, adapted for vector operation. In FIG. 1, a memory unit 1 stores instruction programs and element data of vectors. A register 2, which is an instruction register, has an input connection to the memory unit 1. A data register 3, in which a descriptor for specifying a vector is prepared, has an input connected to the memory unit 1. The descriptor is a set of information indicating the location of an element data in the memory unit 1. The information is, for example, the type of a vector expression, the first element data location address, called herein the "start address", the distance between two successive element data location addresses and the number of the element, called herein the "length", and so on. A plurality of element address operators 4A, 4B and 4C, which generate an element address, hereinafter referred to as operators, have write-in inputs connected in common to the output of the data register 3 and have write-ins connected to the memory unit 1.

The operators 4A, 4B and 4C have readout outputs connected to inputs of buffer registers 5A, 5B and 5C, respectively which stores the respective element address generated by the respective element address operator. The buffer registers 5A, 5B and 5C have outputs connected in common with the readout output of the instruction register 2 to the memory unit 1. The element address generated in the element address operators 4A, 4B and 4C is set in the buffer registers 5A, 5B and 5C, respectively. The element address may be generated in the same manner as the generation of an instruction address in a stored program type computer. That is, a constant number is added to the provided address.

An operation processor 6, which provides arithmetic operation of the element data includes data buffer registers 7A, 7B and 7C for storing data to be read out when access is provided to the memory unit 1 with an address stored in a buffer register. Each of the data buffer registers 7A, 7B and 7C is connected to the memory unit 1. The operation processor 6 may be of any suitable known type such as, for example, a pipe line processor.

When instruction of vector operation is set in the instruction register 2, access is provided to the descriptor, which is set in the data register 3 by means of the operand designator (not shown in the FIGS.) in said instruction. Thus, each element address operator 4A, 4B and 4C sequentially generates the address of each vector element which comprises vectors A, B and C, that is, adding a constant number to a provided address in accordance with the information shown by said descriptor.

The data flow is outlined as follows. In other words, the 0th element data of the vector B is read via the buffer register 5B according to the 0th element address of the vector B, which is the area of the element data of the element sequence 0, and is also the same thereinafter provided by the operator 4B. Simultaneously the 0th element data is also read out via the buffer register 5C, according to the 0th element address provided by the operator 4C. Respective data is fed to the operator processor 6 for arithmetic operation, and is then stored in the result indication data buffer register 7A, and is, furthermore, written in accordance with the 0th element address provided by the operator 4A. The same operation is repeated for the first element of the vector, the second element of the vector, . . . , sequentially.

Each memory bank has a busy signal which indicates whether or not the corresponding bank is busy. Thus, if there is a busy signal, the corresponding bank is on access and is not available for another access. This is a technique known to anyone ordinarily skilled in the art.

Figure 2:
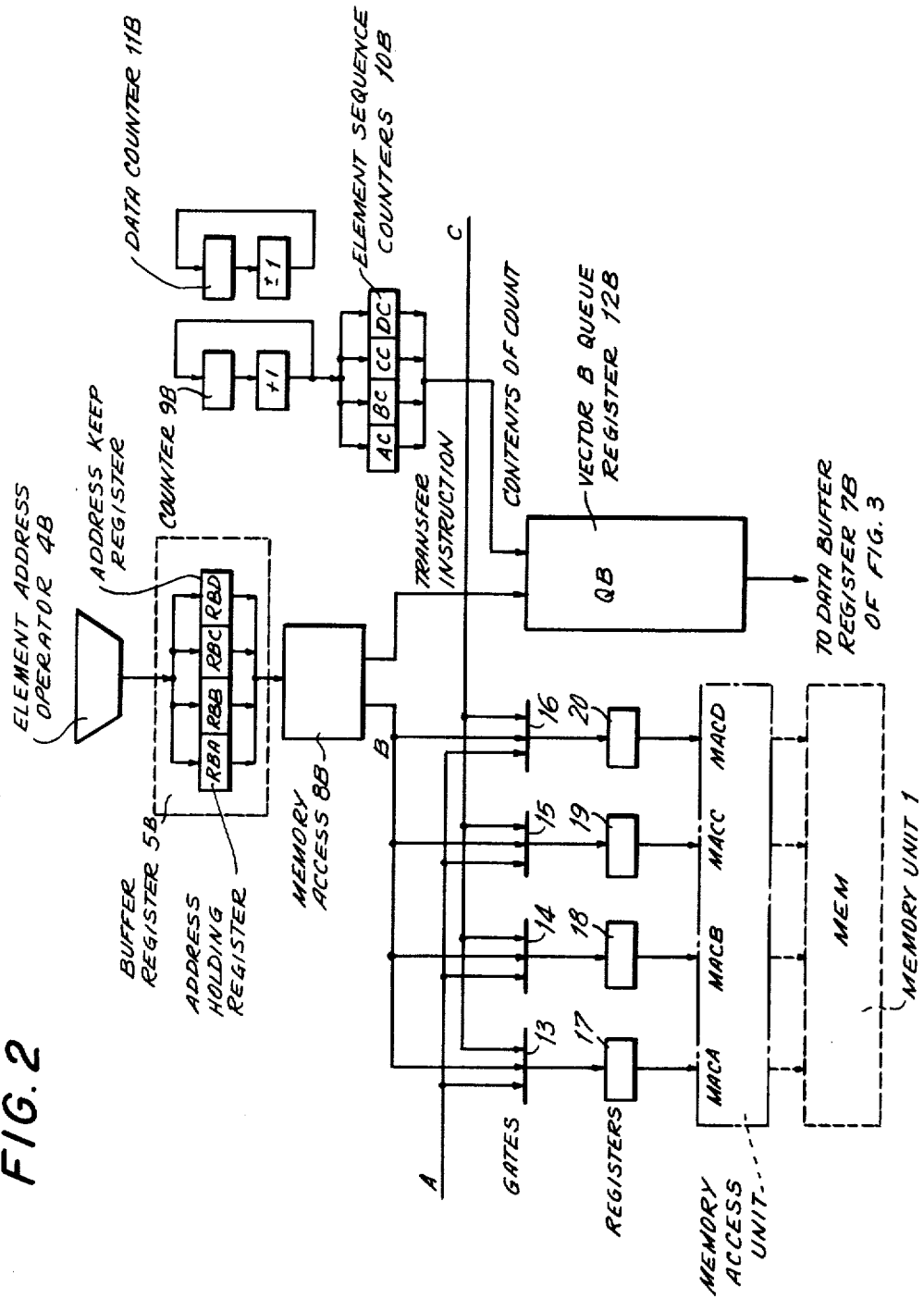
FIG. 2 is a block diagram of an embodiment of the access sequence controller of the invention.

FIG. 2 is a block diagram of an embodiment of the access sequence controller of the invention. FIG. 2 is a detailed configuration of a part of the controller relating only to the vector B, for providing access to the memory unit 1 in accordance with the operated address of FIG. 1. In FIG. 2, the memory unit 1, the element address operator 4B and the buffer register 5B are the same as those of FIG. 1. The buffer register 5B includes a plurality of address holding registers RBA, RBB, RBC and RBD for setting four addresses. The address holding registers RBA to RBD have inputs connected in common to the output of the element address operator 4B and outputs connected in common to the input of a memory access 8B.

The memory access 8B monitors an idle memory condition and supplies the address information set in the address holding registers RBA to RBD to a memory access unit MACA to MACD via a plurality of OR gates 13, 14, 15 and 16 and a plurality of registers 17, 18, 19 and 20. The OR gates 13 to 16 have an input of each connected in common to an output of the memory access 8B and outputs connected in common to the inputs of the registers 17, 18, 19 and 20, respectively. The outputs of the registers 17 to 20 are connected to the memory unit 1 via the memory access unit.

A counter 9B counts elements and proceeds one step each time the operator 4B provides an element address output. The output of the counter is connected in common to inputs of a plurality of element sequence counters 10B. The element sequence counters 10B, which comprise counters AC, BC, CC and DC, have an 8 bit capacity and indicate that the address set in the corresponding address holding registers RBA, RBB, RBC and RBD corresponds to the element in a specified number. A data counter 11B controls the data number in the data buffer register for the vector B (FIG. 1), as hereinafter described. The data counter 11B is used to check whether the number of elements generated exceeds the length of the descriptor. Therefore, the data counter 11B is not connected to any component. The count of the data counter 11B is increased by "1" when data is fed into the data buffer register and is decreased by "1" when data is fed out from said data buffer register. The outputs of the element sequence counters 10B are connected in common to an input of a vector B queue register 12B, which is a shift register and provides 11 clocks delay to the inputs. The other output of the memory access 8B is connected to the other input of the queue register 12B. The output of the queue register 12B is connected to an input of the data buffer register 7B of FIG. 3.

The contents of one of the element sequence counters 10B are stored in the shift register 12B under the control of the transfer instruction signal from the memory access 8B.

The circuit of FIG. 2 functions as the access sequence controller of the invention for the element address of the vector B. A similar circuit must be provided for the element address of the vector A and also for the element address of the vector C.

Each element address operated by the element address operator 4B is set immediately whenever any one of the address holding registers RBA to RBD becomes idle. The memory access 8B competes with memory access 8A and memory access 8C for the vectors A and C (not shown in the FIGS.), and transfers the content or element address, of any one of the address holding registers RBA to RBD to the memory access unit, MACA, MACB, MACC, MACD. Thus, the element data corresponding to the relevant address is read out and set in the element data readout register 21 hereinafter described with regard to FIG. 3.

Figure 3:
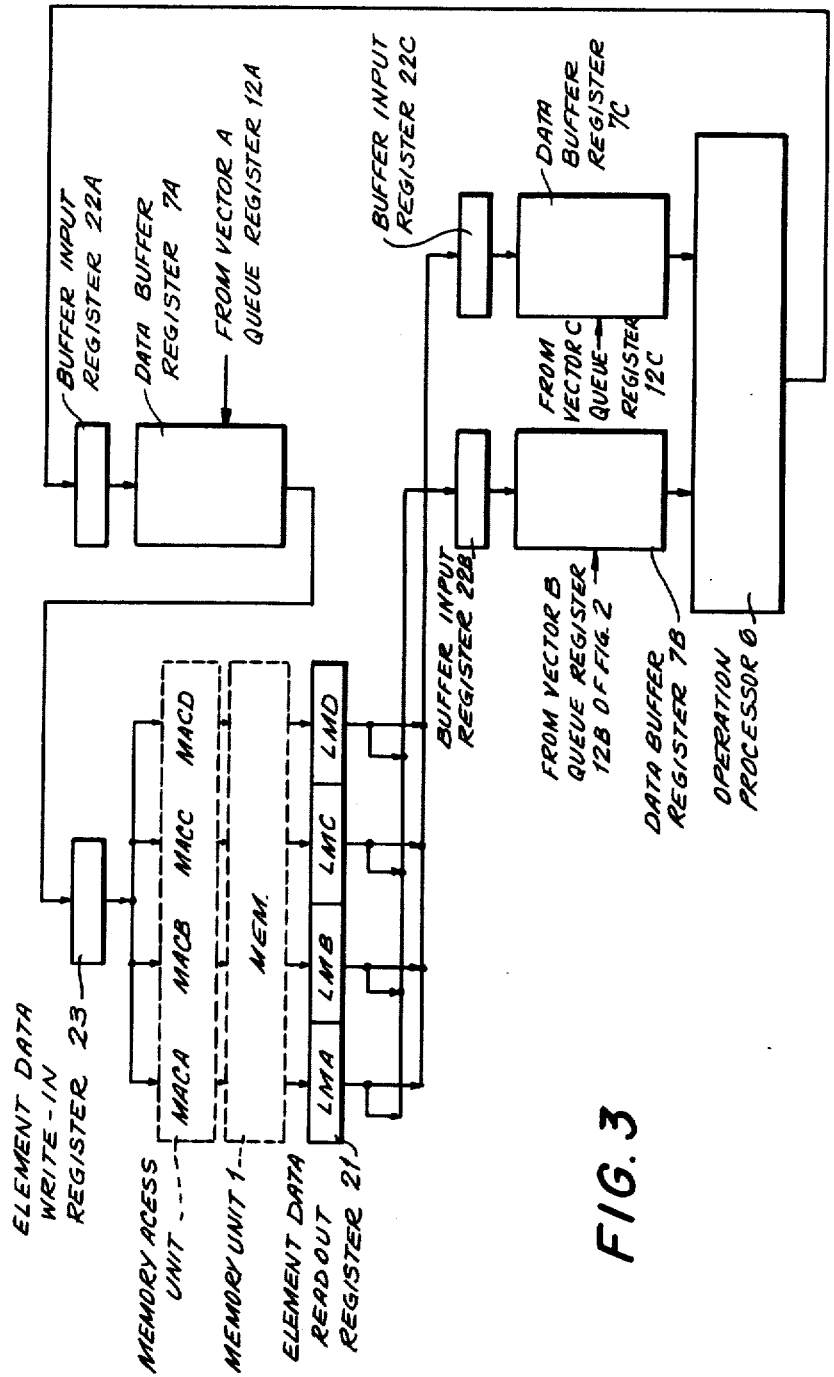
FIG. 3 is a block diagram of an embodiment of the access sequence controller of the invention, adapted for data reading, operation and storage control corresponding to access.

FIG. 3 is a block diagram of an embodiment of the access sequence controller of the invention, adapted for data reading, operation and storage corresponding to access. In FIG. 3, an element data readout register 21, comprising registers LMA, LMB, LMC and LMD, has inputs connected to outputs of the memory unit 1 and outputs connected in common to the input of a buffer input register 22B and to the input of a buffer input register 22C. The output of the buffer input register 22B is connected to an input of the data buffer register 7B (FIG. 1) and the output of the buffer input register 22C is connected to an input of the data buffer register 7C (FIG. 1). The vector B queue register 12B (FIG. 2) is connected to another input of the data buffer register 7B. The vector C queue register 12C (not shown in the FIGS.) is connected to another input of the data buffer register 7C.

The outputs of the data buffer registers 7B and 7C are connected to inputs of the operation processor 6 (FIG. 1). The output of the operation processor 6 is connected to the input of a buffer input register 22A. The output of the buffer input register 22A is connected to an input of the data buffer register 7A (FIG. 1). The vector A queue register 12A (not shown in the FIGS.) is connected to another input of the data buffer register 7A. The output of the data buffer register 7A is connected to an input of an element data write-in register 23. The output of the element data write-in register 23 is connected to the inputs of the memory access unit (FIG. 2). The outputs of the memory access unit are connected to the inputs of the memory unit 1.

In compliance with the access to the memory unit explained with regard to FIG. 2, the element data of vector B is stored in the data buffer register 7B from the readout register 21 via the buffer input register 22B. The element data of vector C is stored in the data buffer register 7C in a similar manner. When the element data of vectors B and C in the same sequence are stored in the data buffer registers 7B and 7C, such data is transferred to the operation processor 6, and operation result data which is element data in the same sequence as that of vector A, is stored in the data buffer register 7A via the buffer input register 22A. At such time, access is provided to the memory unit 1 according to the address regarding the relevant element of the vector A, as explained in connection with FIG. 2. The element data stored in the data buffer register 7A is then written in the relevant address in the memory unit 1.

As hereinbefore mentioned, the element data of vectors B and C is read out and the element data of vector A is written. However, as is clear from FIG. 2, the element address is sequentially read out from the element address operator 4B, like the 0th element, first element, . . . , of vector B, but the sequence of output from the address holding registers RBA to RBD of the buffer register 5B is determined by the idle state of the memory unit 1, and it does not always follow the sequence of elements.

For this reason, the aforedescribed sequence is controlled correctly by providing the element sequence counters AC, BC, CC, DC and the queue register 12B (FIG. 2). These counters and register are also provided for the other vectors. This condition is explained with reference to FIGS. 4A, 4B and 4C. The reference numerals and letters of FIGS. 4A, 4B and 4C are the same as those of FIGS. 1, 2 and 3.

As hereinbefore mentioned, each of the element sequence counters AC, BC, CC, DC has a capacity of 8 bits. Thus, for example, if an element address is set in the buffer register or address holding register RBB (FIG. 2), the content or count of the counter 9B (FIG. 2) for elements at such time is set in the element sequence counter BC.

Figure 4A:
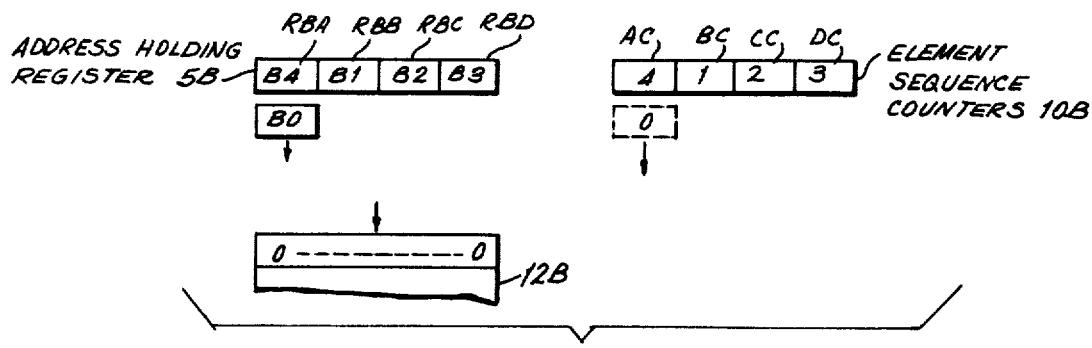
FIGS. 4A, 4B and 4C are schematic diagrams for explaining the operation of the access sequence controller of the invention.
Figure 4B:
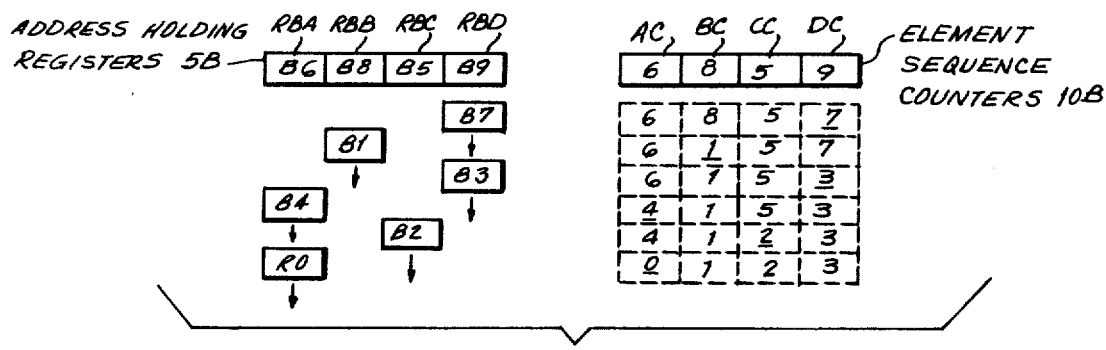
Figure 4C:
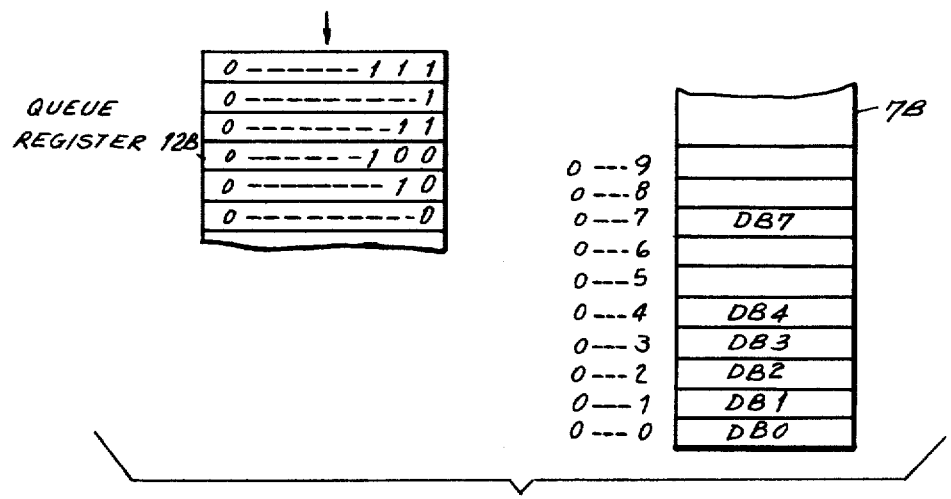

Referring to FIG. 4A, when the 0th element address B0 is set in the address holding register RBA, "0" is set in the element sequence counter AC. Then, when the first element address B1 is set in the address holding register RBB, "1" is set in the element sequence counter BC. In addition, when the second element address B2 is set in the address holding register RBC, "2" is set in the element sequence counter CC. When the third element address B3 is set in the address holding register RBD, "3" is set in the element sequence counter DC.

When the content BD of the address holding register RBA is transferred to provide access to the memory unit 1, the fourth element address B4 is set in the address holding register RBA. At such time, the memory access 8B of FIG. 2 informs the queue register 12B that the content of register RBA is transferred. Therefore, the content "0" of the element sequence counter AC is stored in the queue register 12B. Succeedingly, "4" is set in the element sequence counter AC.

FIG. 4B shows the access profile. In FIG. 4B, the 0th element address B0 is transferred from the address holding register RBC, the second element address B2 is transferred from the address holding register RBC, the fourth element address B4 is transferred from the address holding register RBA, the third element address B3 is transferred from the address holding register RBD, and the first element address is transferred from the address holding register RBB. As a result, the 0th, 2nd, 4th, 3rd, 1st and 7th element addresses are sequentially transferred to the queue register 12B and controlled or managed.

The period, commencing after the memory access 8B of FIG. 2 transfers an element address until the corresponding element data is read out by the element data readout register 21 of FIG. 3 and set in the data buffer register 7B, is, for example, 11 clock signals. Therefore, after a count indicating the element sequence, which indicates that access is provided by the element address of relevant element sequence, is set in the queue register 12B, the count is shifted for each clock signal and fed out from the queue register 12B at the 11th clock signal. The output is then used as a control to set the read out element data in the data buffer register 7B of FIG. 3.

In other words, the data buffer register 7B or 7C has 128 addresses as a whole. On the other hand, each of the element sequence counters AC, BC, CC, DC of FIG. 2 has a capacity of 8 bits. For this reason, the output of the queue register 12B has a capacity of 8 bits. The lower 7 bits of the 8 bits correspond to 128 addresses of data buffer register 7B or 7C. FIG. 4C outlines these conditions.

In accordance with the example of FIG. 4C, the data "00000000" and "00000010" . . . are fed out in succession from the queue register 12B. For this reason, when the output "00000000" appears, the 0th element data DB0 is read out and set in the address "0" of the data buffer register 7B, the data DB2 is read out and set in the address "2", and the data DB4 is read out and set in the address "4". Similarly, data DB7 is read out and set in the address "7". In FIG. 4C, data DB5, DB6, DB8 and DB9 are not yet read out.

When the element data of generally lower address number are arranged in both data buffer registers 7B and 7C, the data from both is supplied to the operation processor 6 of FIG. 3.

The highest bit of the output from the queue register 12B or 12C is used as the control bit. If the bit is a logical "0" the sequence of the relevant vector element is ranked in the 0th or 127th, 256th to 383rd, . . . . If the bit is a logical "1", the sequence of the aforedescribed vector element is ranked in the 128th to 255th, 384th to 511th . . . . Therefore, even if an element data of lower address is arranged in the data buffer register 7B or 7C, the 127th element data will be supplied to the operation processor 6 prior to the 128th element data. The aforementioned highest bit is used for this control. This control is not described herein, however.

The corresponding control between the element data in the data buffer register 7A and the element address of vector A may be accomplished in almost the same manner, except for the difference between readout and write-in operation.

As hereinbefore explained, the access sequence controller of the invention controls the supply sequence of element data to the operation processor 6 and write-in from the data buffer register 7A to the memory unit 1 may be provided correctly even if the access sequence differs in accordance with the idle condition of the memory unit.

While the invention has been described by means of a specific example and in a specific embodiment, we do not wish to be limited thereto, for obvious modifications will occur to those skilled in the art without departing from the spirit and scope of the invention.

We claim:

1. A memory access control system for a memory unit in a data processing system for reading out element data from the memory unit and providing sequential data processing, especially for vector processing, said memory access control system comprising address holding register means for holding addresses which indicate where the element data is stored when an element address is set in said address holding register means;

memory means for storing sequence data indicating the sequence of an element data stored in the memory unit;

shift register means connected to the memory means at least for storing the contents of the memory means corresponding to the address which is in use for accessing to said memory unit in accordance with a selected content of said address holding register means, said shift register means having outputs; and data buffer register means connected to said memory unit and controlled by the outputs of said shift register means whereby the element data read out from said memory unit is stored at a location of said data buffer register means by means of the outputs of said shift register means.

2. A memory access control system as claimed in claim 1, wherein said memory means comprises a plurality of registers corresponding to said address holding register means, and further comprising counter means connected to said plurality of registers for supplying sequence data to said registers, said sequence data corresponding to the address set in said address holding register means.

* * * * *